(12) United States Patent
Wang (10) Patent No.: US 6,695,101 B1
(45) Date of Patent: Feb. 24, 2004

(54) SPOOLING APPARATUS

(76) Inventor: Chih-Hsin Wang, No. 40, Alley 36-11, Lane 210, Section 1, Chu Shih Road, Lung Ching Hsiang, Taichung Hsien (TW)

( * ) Notice: Subject to any disclaimer, the term of this patent is extended or adjusted under 35 U.S.C. 154(b) by 0 days.

(21) Appl. No.: 10/212,337

(22) Filed: Aug. 5, 2002

(51) Int. Cl.[7] .......................... G65H 75/40; F16D 63/00
(52) U.S. Cl. .................. 188/82.1; 188/65.1; 242/388.6
(58) Field of Search .............................. 188/82.1, 65.1; 242/382–385, 388.6

(56) References Cited

U.S. PATENT DOCUMENTS 5,423,494 A * 6/1995 Kondo ..................... 242/381.5
6,152,395 A * 11/2000 Corriveau et al. ........ 242/388.6
6,467,182 B2 * 10/2002 Usami ..................... 242/381.6

* cited by examiner

Primary Examiner—Christopher P. Schwartz
(74) Attorney, Agent, or Firm—Alan Kamrath; Rider Bennett, LLP (57) ABSTRACT

A spooling apparatus includes a housing, a spool received in the housing so that the spool can be rotated from an original position by an external force and automatically returned to the original position when released from the external force, a rope wound on the spool and a tension-controlling device received in the housing for controlling the tension of the rope in order to control the speed of the rope when wound back onto the spool. Furthermore, the spooling apparatus includes a braking device for slowing down the speed of the rope.

18 Claims, 7 Drawing Sheets

SPOOLING APPARATUS

BACKGROUND OF INVENTION

1. Field of Invention

The present invention relates to a spooling apparatus.

2. Related Prior Art

Taiwanese Patent Publication No. 392686 teaches a conventional spooling device. The conventional spooling device includes a housing, a shaft installed in the housing, a spool mounted on the shaft and a rope wound on the spool. The spool is mounted on the shaft so that it can be rotated from an original position by means of an external force and will be returned to the original position when it is released from the external force. The automatic winding of the rope back onto the spool is done via a coil spring. However, the speed of the rope when wound back onto the spool is quite high and the fast moving rope can cut a user.

The present invention is therefore intended to obviate or at least alleviate the problems encountered in prior art.

SUMMARY OF INVENTION

It is the primary objective of the present invention to provide a spooling apparatus capable of controlling the speed of a rope.

According to the present invention, a spooling apparatus includes a housing, a spool received in the housing so that the spool can be rotated from an original position by an external force and automatically returned to the original position when released from the external force, a rope wound on the spool and a tension-controlling device received in the housing for controlling the tension of the rope in order to control the speed of the rope when wound back onto the spool.

The tension-controlling device includes a contacting element movably received in the housing for contact with the rope and a positioning element for controlling the position of the contacting element relative to the rope.

The positioning element is in rotational engagement with the contacting element.

The positioning element includes a bolt formed with a thread. The contacting element defines a tunnel including a wall formed with a thread in engagement with the thread formed on the bolt.

The positioning element includes a head with a non-circular profile. The housing includes a wall defining a circular space in which the head can rotate and a non-circular space in which the head cannot rotate. The circular space is in communication with the non-circular space. The non-circular profile may be a hexagonal profile and the non-circular space may be a hexagonal space.

The tension-controlling device includes a spring for biasing the head into the non-circular space. The spring is a compressive spring. The spring contacts the contacting element. The contacting element includes a first terminal portion, a second terminal portion and a slot defined therein between the first and second terminal portions. The housing includes a post extending from an internal face thereof into the slot. The spring is received in the slot and compressed between the post and the first terminal portion of the contacting element.

The spooling apparatus includes a braking device for slowing down the speed of the rope.

The braking device includes a button being movable between an idle position and an active position and including a first terminal portion for contact with a user's finger and a second terminal portion for contact with the spool in the active position.

The braking device includes a brake shoe secured to the second terminal portion of the button.

The braking device includes a lock for locking the button in the active position.

The button includes a latch extending from a side of the button. The lock can be switched between a locking position and a releasing position and defines a recess so that the latch is allowed to slide in the recess in the releasing position and that the latch is prevented from sliding in the recess in the locking position.

The braking device includes a spring for biasing the button from the active position to the idle position. The spring is a compressive spring.

Other objectives and novel features of the invention will become more apparent from the following detailed description when taken in conjunction with the attached drawings.

BRIEF DESCRIPTION OF DRAWINGS

The present invention will be described through detailed illustration of embodiments referring to the attached drawings wherein.

DETAILED DESCRIPTION OF INVENTION

Figure 1:
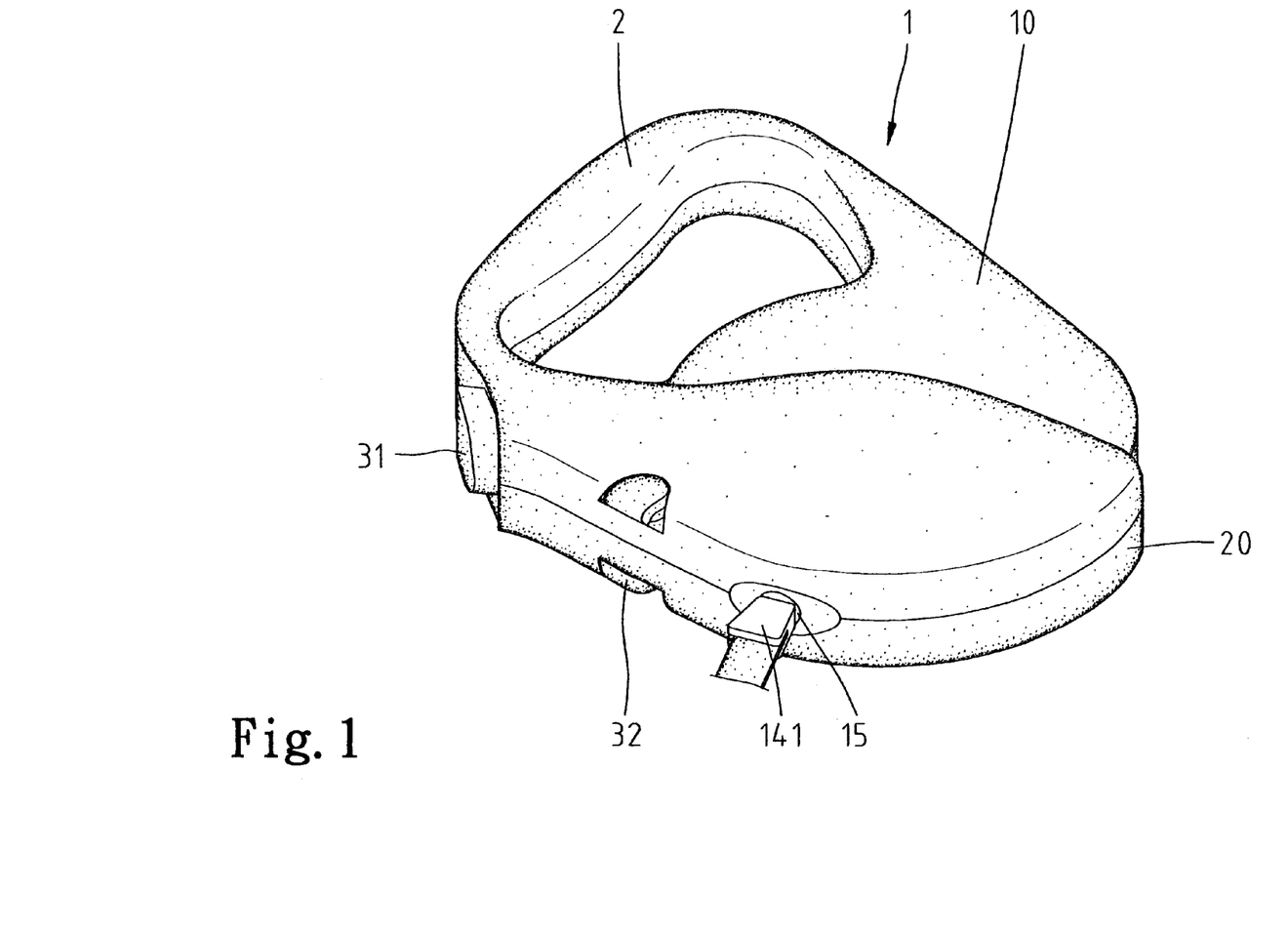
FIG. 1 is a perspective view of a spooling apparatus according to the present invention.
Figure 2:
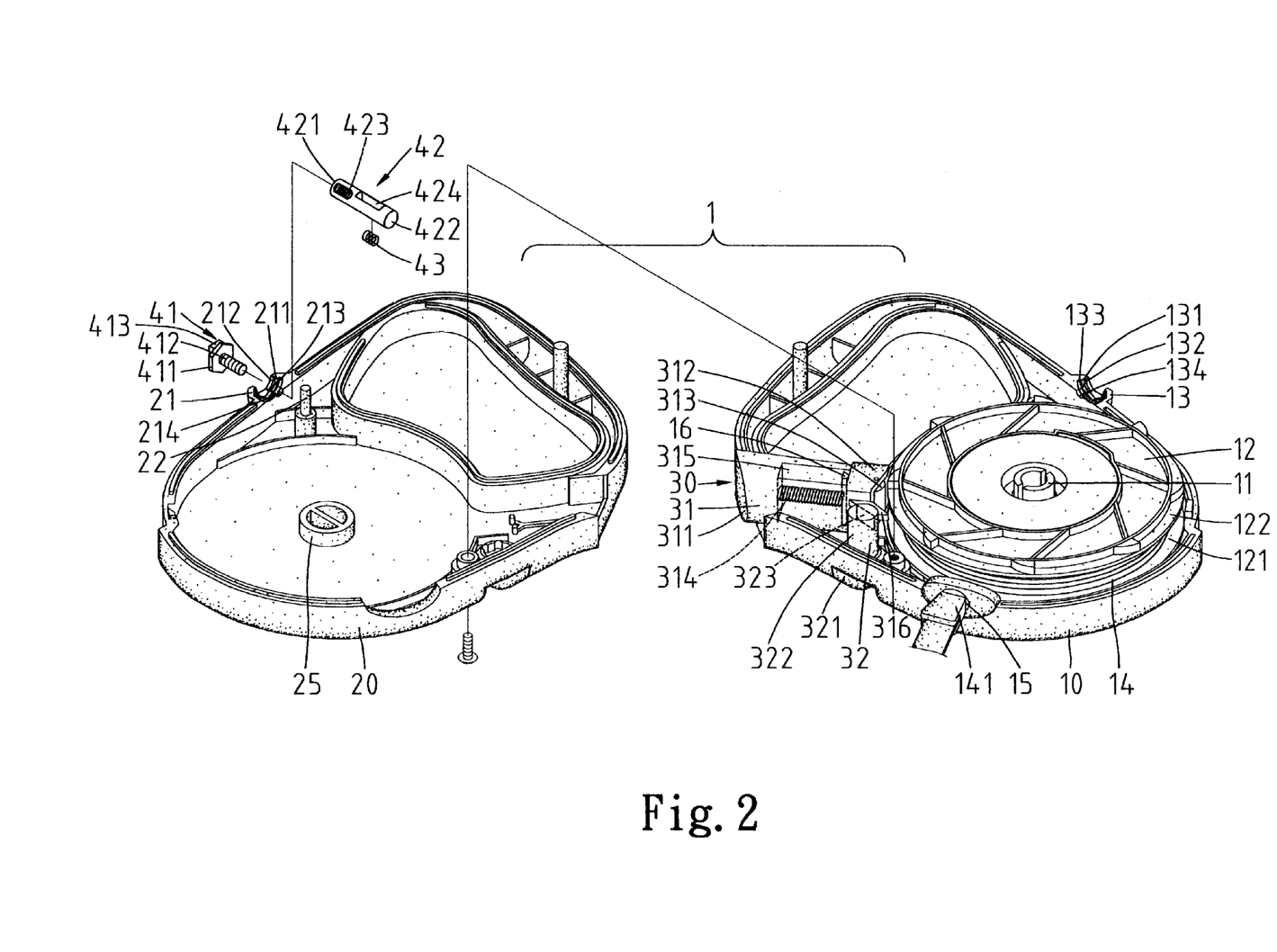
FIG. 2 is an exploded view of a spooling apparatus according to the present invention.

Referring to FIGS. 1 and 2, according to the present invention, a spooling apparatus 1 includes a housing consisting of a first shell 10 and a second shell 20. The housing includes a handle 2 to be gripped by a user's hand.

The first shell 10 includes a panel (not numbered), a rim (not numbered) extending on and along the panel, a shaft 11 formed on the panel, a boss 13 formed on the rim, an aperture 15 defined in the rim and a post 16 extending from the panel.

The boss 13 defines a semi-hexagonal recess 131 and a semi-circular recess 133 in communication with the semi-hexagonal recess 131 and includes an external semi-annular rim 132 formed thereon next to the semi-hexangular recess 131 and an internal semi-annular rim 134 formed thereon next to the semi-circular recess 133.

A spool 12 is mounted on the shaft 11 so that it can be rotated from an original position by means of an external force and will be returned to the original position when it is released from the external force. The spool 12 includes a periphery (not numbered) and two annular rims 122 extending on and along the periphery, thus defining a space 121 between the annular rims 122.

A rope 14 is wound on the spool 12. The rope 14 includes a first end (not shown) tied to the spool 12 and a second end extending through the aperture 15. A head 141 is bonded with the second end of the rope 14.

The second shell 20 includes a panel (not numbered), a rim (not numbered) extending on and along the panel thereof, a hub 25 formed on the panel thereof, a boss 21 formed on the rim thereof and a post 22 extending from the panel thereof.

The boss 21 defines a semi-hexagonal recess 211 and a semi-circular recess 213 in communication with the semi-hexagonal recess 211 and includes an external semi-annular rim 212 formed thereon next to the semi-hexangular recess 211 and an internal semi-annular rim 214 formed thereon next to the semi-circular recess 213.

The first shell 10 and the second shell 20 are combined. The shaft 11 is inserted in the hub 25. The boss 13 and the boss 21 are matched. Thus, the semi-hexagonal recesses 131 and 211 together make a hexagonal space. The semi-circular recesses 133 and 213 together make a circular space. The external semi-annular rims 132 and 212 together define a circular aperture. The internal semi-annular rims 134 and 214 together define a circular aperture.

A braking device 30 is arranged between the first shell 10 and the second shell 20 next to the spool 12. The braking device 30 includes a button 31 movable between an idle position and an active position for retaining the spool 12 still and a lock 32 for retaining the button 31 in the active position.

The button 31 includes a first terminal portion 311 inserted through an aperture defined in the housing for contacting the user's hand and a second terminal portion 312 to which a brake shoe 313 is secured for contacting the rims 122 of the spool 12. The button 31 defines a slot 315 in order to receive the post 16. A spring 314 is received in the slot 315. The spring 314 includes a first end attached to the post 16 and a second end for contacting the second terminal portion of the button 31. The spring 314 is biased so the first terminal portion 311 of the button 31 tends to be pushed away from the post 16 until the second terminal portion 312 of the button 31 is engaged with the post 16. From the second terminal portion 312 of the button 31 extends a latch 316 for engagement with the lock 32.

The lock 32 is a cylindrical element including a first terminal portion 321 positioned outside the housing and a second terminal portion 322 inserted through an aperture defined in the first shell 10. Thus, the lock 32 is pivotal relative to the first shell 10. The first terminal portion 321 of the lock 32 is enlarged and formed as a knob to be rotated by the user's hand. A recess 323 is transversely cut into the second terminal portion 322 of the lock 32.

Figure 3:
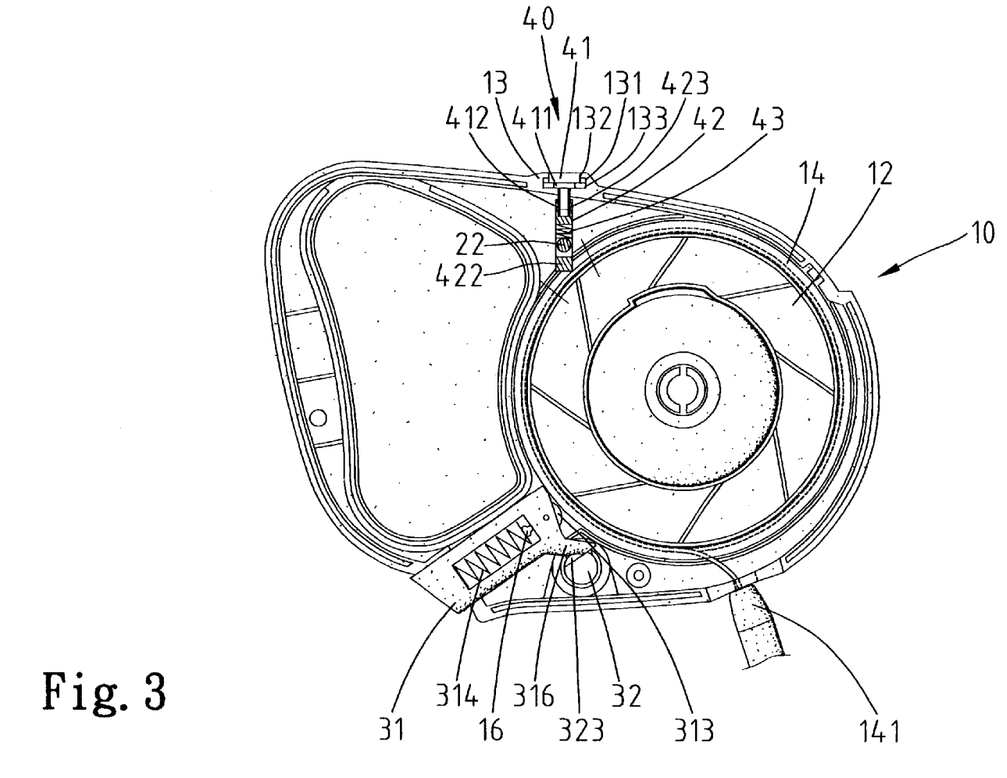
FIG. 3 is a cross-sectional view of a spooling apparatus according to the present invention.

The first terminal portion 321 of the lock 32 formed as a knob can be operated so as to rotate the lock 32 to a releasing position as shown in FIG. 3 where the latch 316 of the button 31 is allowed to move freely in the recess 323 defined in the lock 32. When the button 31 is moved to the active position, the first terminal portion 321 of the lock 32 formed as a knob can be operated so as to rotate the lock 32 to a locking position as shown in FIG. 2 where the latch 316 of the button 31 is restricted via the second terminal portion 322 of the lock 32. Thus, the button 31 is locked in the active position via the lock 32. That is, the spool 12 is retained still.

Figure 4:
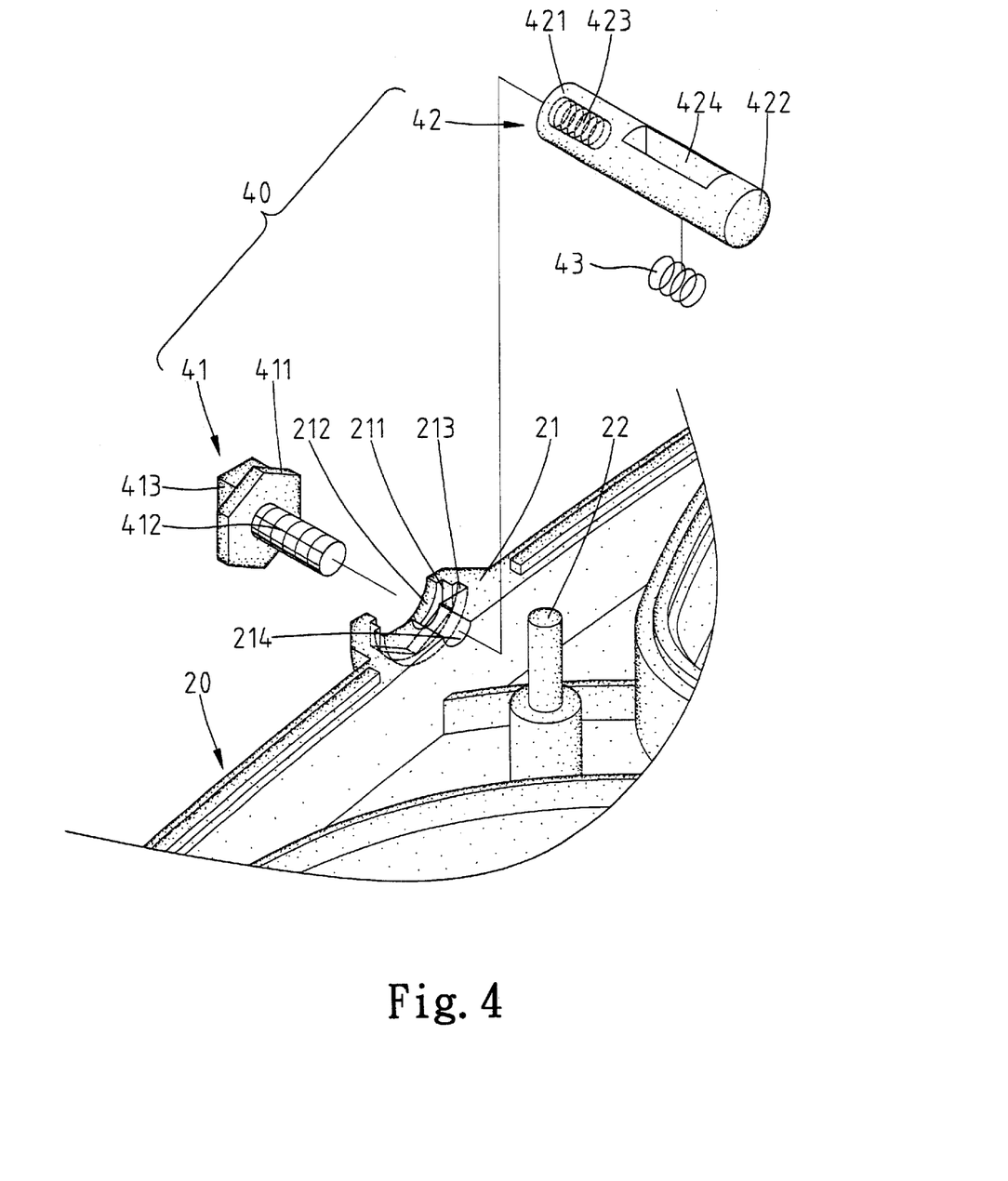
FIG. 4 is an enlarged partial view of a spooling apparatus according to the present invention.

Referring to FIG. 4, a tension-controlling device 40 includes a positioning element 41 and a contacting element 42. The contacting element 42 is for contacting the rope 14. The positioning element 41 is for positioning the contacting element 42.

The positioning element 41 includes a hexagonal head 411, a bolt 412 formed on a side of the hexagonal head 411 and formed with a thread and a knob 413 formed on an opposite side of the head 411.

Figure 5:
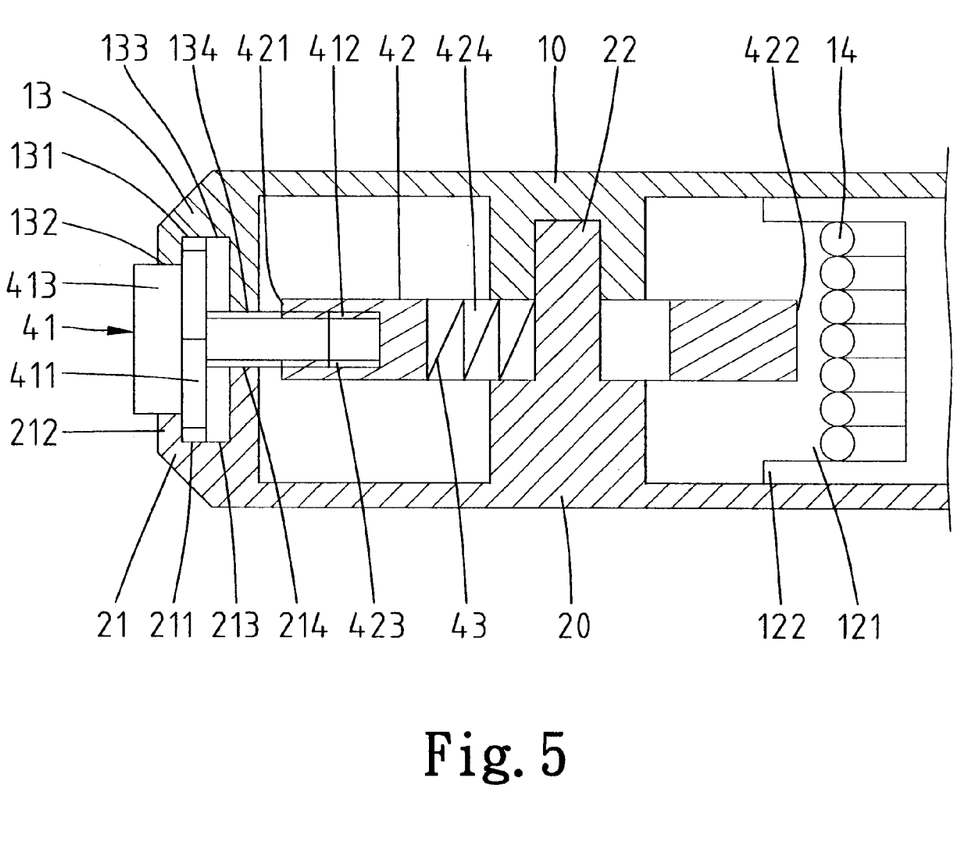
FIG. 5 is a cross-sectional view of a spooling apparatus according to the present invention, showing a tension-controlling device locked in an idle position.

The positioning element 41 is put between the first shell 10 and the second shell 20. The hexagonal head 411 is restrained in the space defined between the bosses 13 and 21 via the matching semi-annular rims 132 and 212 and the matching semi-annular rims 134 and 214. The head 411 is movable between the hexagonal space made by the semi-hexagonal recesses 131 and 211 and the circular space made by the semi-circular recesses 133 and 213. Rotation of the bolt 412 is prevented when the hexagonal head 411 is in the hexagonal space as shown in FIG. 5. The knob 413 can be operated in order to rotate the bolt 412 when the hexagonal head 411 is in the circular space as shown in FIG. 6.

The contacting element 42 includes a first terminal portion 421 for engagement with the bolt 412 of the positioning element 41 and a second terminal portion 422 for contact with the rope 14. The first terminal portion 421 of the contacting element 42 defines a tunnel 423 with a wall on which a thread is formed. The contacting element 42 defines a slot 424.

The thread formed on the bolt 412 is engaged with the thread formed on the wall of the tunnel 423. The post 22 is inserted through the slot 424. A spring 43 is received in the slot 424 and compressed between the post 22 and the first terminal portion 421 of the positioning element 41. Thus, the hexagonal head 411 is retained in the hexagonal space as shown in FIG. 5, i.e., rotation of the bolt 412 is avoided.

Figure 6:
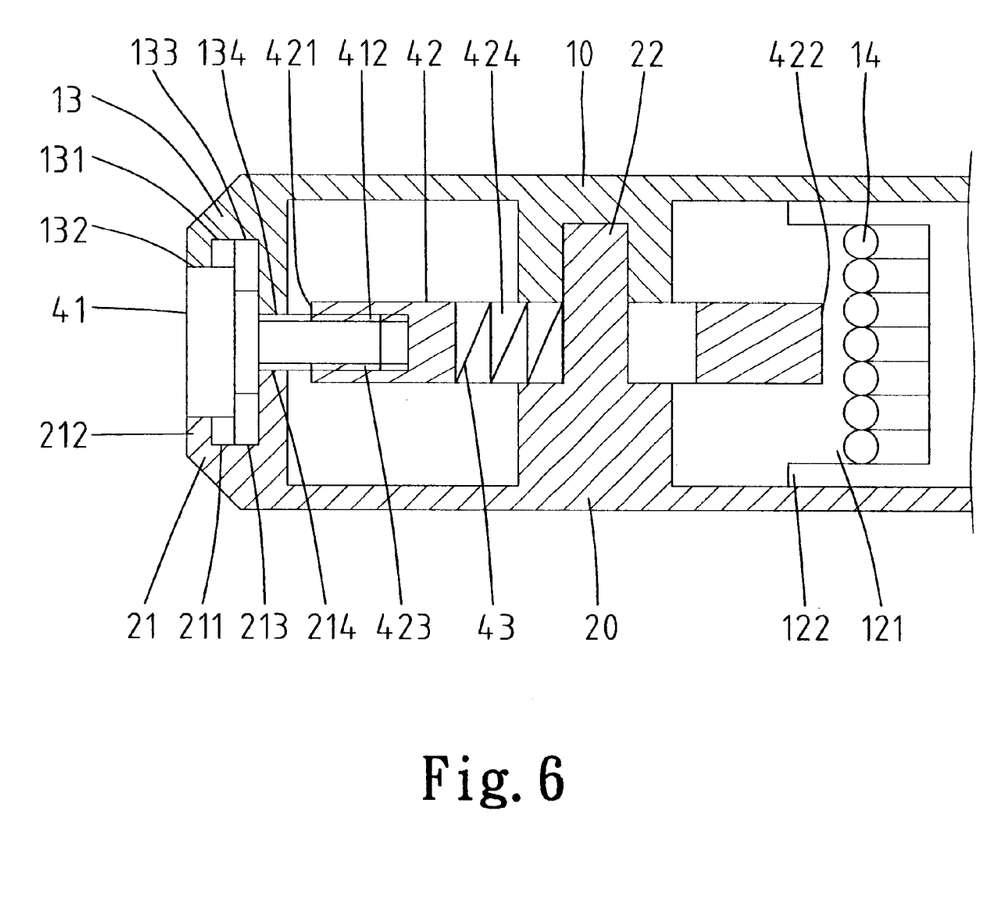
FIG. 6 is similar to FIG. 5 but showing the tension-controlling device free from the idle position.
Figure 7:
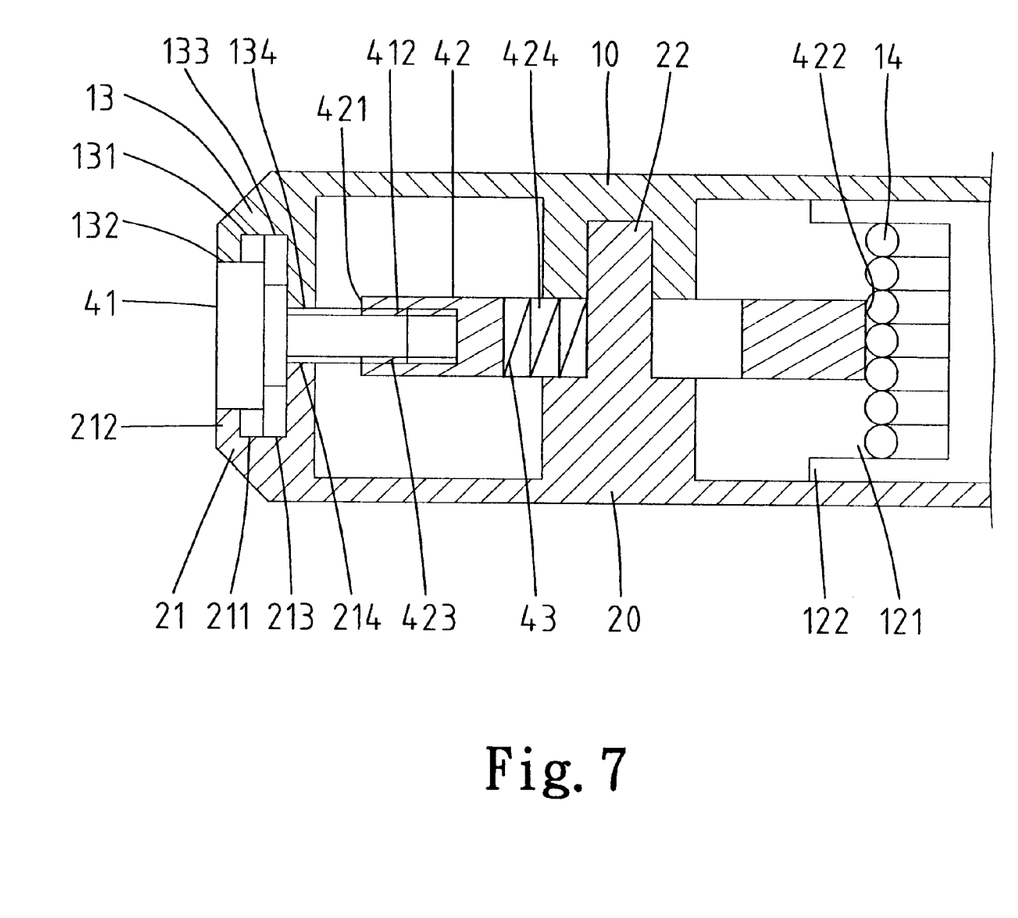
FIG. 7 is similar to FIG. 5 but showing the tension-controlling device in an active position.

The positioning element 41 can be pushed from the position shown in FIG. 5 to the position shown in FIG. 6. The hexagonal head 411 is moved from the hexagonal space into the circular space. Thus, the bolt 412 of the positioning element 41 can be rotated relative to the first terminal portion 421 of the contacting element 42 so as to move the second terminal portion 422 of the contact element 42 from the position shown in FIG. 5 to the position shown in FIG. 7 where the second terminal portion 422 of the contact element 42 contacts the rope 14, and vice versa.

The present invention has been described through detailed illustration of the preferred embodiment. Those skilled in the art can derive many variations from the preferred embodiment without departing from the scope of the present invention. Therefore, the preferred embodiment shall not limit the scope of the present invention. The scope of the present invention is defined in the attached claims.

What is claimed is:

1. A spooling apparatus including a housing; a spool received in the housing so that the spool can be rotated from an original position by an external force and automatically returned to the original position when released from the external force; a rope wound on the spool; and a tension-controlling device received in the housing for controlling the tension of the rope in order to control the speed of the rope when wound onto the spool, wherein the tension-controlling device includes a contacting element movably received in the housing for contact with the rope and a positioning element, wherein the positioning element is in rotational engagement with the contacting element for controlling the position of the contacting element relative to the rope.

2. The spooling apparatus according to claim 1 wherein one of the positioning element and the contacting element includes a bolt formed with a thread and the remaining one of the positioning element and the contacting element defines a tunnel including a wall formed with a thread in engagement with the thread formed on the bolt.

3. The spooling apparatus according to claim 2 wherein the positioning element includes a head with a non-circular profile, and the housing includes a wall defining a circular space in which the head can rotate and a non-circular space in which the head cannot rotate, the circular space being in communication with the non-circular space.

4. The spooling apparatus according to claim 3 wherein the non-circular profile is a hexagonal profile, and the non-circular space is a hexagonal space.

5. The spooling apparatus according to claim 4 wherein the tension-controlling device includes a spring for biasing the head into the non-circular space.

6. The spooling apparatus according to claim 5 wherein the spring contacts the contacting element.

7. The spooling apparatus according to claim 6 wherein the housing includes a post extending from an internal face thereof, and the spring is compressed between the post and the contacting element.

8. The spooling apparatus according to claim 7 wherein the contacting element includes a first terminal portion, a second terminal portion and a slot defined therein between the first and second terminal portions and the housing includes a post extending from an internal face thereof into the slot and the spring is received in the slot and compressed between the post and the first terminal portion of the contacting element.

9. The spooling apparatus according to claim 5 wherein the spring is a compressive spring.

10. The spooling apparatus according to claim 5 wherein the contacting element defines a slot, and the housing includes a post extending from an internal face thereof into the slot.

11. The spooling apparatus according to claim 2 wherein the positioning element includes a bolt formed with a thread and the contacting element defines a tunnel including a wall formed with a thread in engagement with the thread formed on the bolt.

12. The spooling apparatus according to claim 1 including a braking device for slowing down the speed of the rope.

13. A spooling apparatus including a housing; a spool received in the housing so that the spool can be rotated from an original position by an external force and automatically returned to the original position when released from the external force; a rope wound on the spool; a tension-controlling device received in the housing for controlling the tension of the rope in order to control the speed of the rope when wound onto the spool; and a braking device for slowing down the speed of the rope, wherein the braking device includes a button being movable between an idle position and an active position and including a first terminal portion for contact with a user's finger and a second terminal portion for contact with the spool in the active position.

14. The spooling apparatus according to claim 13 wherein the braking device includes a lock for locking the button in the active position.

15. The spooling apparatus according to claim 14 wherein the button includes a latch extending from a side of the button, and the lock can be switched between a locking position and a releasing position and defines a recess so that the latch is allowed to slide in the recess in the releasing position and that the latch is prevented from sliding in the recess in the locking position.

16. The spooling apparatus according to claim 13 wherein the braking device includes a brake shoe secured to the second terminal portion of the button.

17. The spooling apparatus according to claim 13 wherein the braking device includes a spring for biasing the button from the active position to the idle position.

18. The spooling apparatus according to claim 17 wherein the spring is a compressive spring.

* * * * *